(12) United States Patent
Hashemzadeh

(10) Patent No.: US 12,398,323 B2
(45) Date of Patent: Aug. 26, 2025

(54) POLYMER POWDER COMPOSITIONS WHICH CAN BE REDISPERSED IN WATER

(71) Applicant: WACKER CHEMIE AG, Munich (DE)

(72) Inventor: Abdulmajid Hashemzadeh, Burghausen (DE)

(73) Assignee: Wacker Chemie AG, Munich (DE)

( * ) Notice: Subject to any disclaimer, the term of this patent is extended or adjusted under 35 U.S.C. 154(b) by 970 days.

(21) Appl. No.: 17/272,906

(22) PCT Filed: Sep. 6, 2018

(86) PCT No.: PCT/EP2018/074048
§ 371 (c)(1),
(2) Date: Mar. 2, 2021

(87) PCT Pub. No.: WO2020/048603
PCT Pub. Date: Mar. 12, 2020

(65) Prior Publication Data
US 2021/0317368 A1 Oct. 14, 2021

(51) Int. Cl.
| C09K 17/44 | (2006.01) |
| C04B 24/26 | (2006.01) |
| C04B 26/04 | (2006.01) |
| C04B 28/02 | (2006.01) |
| C04B 40/00 | (2006.01) |
| C09K 17/22 | (2006.01) |
| C04B 103/00 | (2006.01) |
| C04B 103/60 | (2006.01) |
| C04B 111/00 | (2006.01) |
| C04B 111/72 | (2006.01) |

(52) U.S. Cl.
CPC .......... *C09K 17/44* (2013.01); *C04B 24/2623* (2013.01); *C04B 24/2652* (2013.01); *C04B 26/04* (2013.01); *C04B 28/02* (2013.01); *C04B 40/0042* (2013.01); *C09K 17/22* (2013.01); *C04B 2103/0057* (2013.01); *C04B 2103/008* (2013.01); *C04B 2103/60* (2013.01); *C04B 2111/00637* (2013.01); *C04B 2111/00732* (2013.01); *C04B 2111/72* (2013.01)

(58) Field of Classification Search
CPC .......... C08L 33/26; C09K 17/44; C09K 17/22; C09K 17/00; C09K 17/40; C09K 3/18; C09K 3/22; C04B 24/2623; C04B 24/2652; C04B 26/04; C04B 28/02; C04B 40/0042; C04B 2103/0057; C04B 2103/008; C04B 2103/60; C04B 2111/00637; C04B 2111/00732; C04B 2111/72
See application file for complete search history.

(56) References Cited

U.S. PATENT DOCUMENTS

| | | | |
|---|---|---|---|
| 3,736,758 A | 6/1973 | Dolfing et al. | |
| 5,763,508 A | 6/1998 | Hess et al. | |
| 5,846,601 A | 12/1998 | Ritter et al. | |
| 5,962,554 A * | 10/1999 | Pakusch | C08L 33/06 528/480 |
| 6,180,705 B1 | 1/2001 | Huebner et al. | |
| 6,368,659 B1 | 4/2002 | Weber et al. | |
| 6,429,239 B1 | 8/2002 | Eck et al. | |
| 6,664,322 B2 * | 12/2003 | Weitzel | C09D 151/003 526/348 |
| 7,288,581 B2 | 10/2007 | Ferrall et al. | |
| 7,874,101 B2 | 1/2011 | Krysiak et al. | |
| 7,972,424 B2 * | 7/2011 | Bastelberger | C04B 40/0042 106/806 |
| 8,033,750 B2 | 10/2011 | Vitale | |
| 8,481,648 B2 | 7/2013 | Schorm et al. | |
| 9,926,232 B2 | 3/2018 | Seidel | |
| 11,325,862 B2 * | 5/2022 | Weitzel | C04B 24/2623 |
| 11,339,228 B2 * | 5/2022 | Hashemzadeh | C08F 218/08 |
| 2006/0128839 A1 * | 6/2006 | Ferrall | C09K 17/18 524/556 |
| 2010/0221418 A1 | 9/2010 | Stadtbäumer et al. | |
| 2011/0274489 A1 | 11/2011 | Vitale | |
| 2011/0274490 A1 | 11/2011 | Vitale et al. | |
| 2014/0171553 A1 * | 6/2014 | Wunderlich | C04B 20/00 524/5 |
| 2016/0177179 A1 | 6/2016 | Lecointe | |
| 2018/0161699 A1 | 6/2018 | Riemer et al. | |
| 2023/0183134 A1 * | 6/2023 | Bannwarth | C04B 24/2641 106/823 |
| 2025/0019314 A1 * | 1/2025 | Bannwarth | C04B 28/06 |

FOREIGN PATENT DOCUMENTS

| CN | 101080479 A | 11/2007 |
| CN | 102618191 A | 8/2012 |
| CN | 106145827 A | 11/2016 |
| DE | 2210256 A1 | 9/1972 |

(Continued)

OTHER PUBLICATIONS

Fox, T. G., Bull. Am. Physics Soc. 1, 3, p. 123 (1956).

(Continued)

*Primary Examiner* — Jane L Stanley
(74) *Attorney, Agent, or Firm* — BROOKS KUSHMAN P.C.

(57) ABSTRACT

Spray dried homogeneous mixtures of a high molecular mass flocculating agent, a base polymer dispersion, and a protective colloid are useful for homogenously stabilizing mixtures such as dust, sand, and/or soil and produce a stabilized composition of high strength.

24 Claims, No Drawings

(56) References Cited

FOREIGN PATENT DOCUMENTS

| | | |
|---|---|---|
| DE | 4324474 A1 | 1/1995 |
| EP | 0741760 B1 | 11/1997 |
| EP | 0765898 B1 | 12/1999 |
| EP | 0992565 B1 | 12/2000 |
| EP | 1892228 B1 | 1/2009 |
| WO | 2006063729 A1 | 6/2006 |
| WO | 2007093551 A1 | 8/2007 |
| WO | 2015071108 A1 | 5/2015 |
| WO | 2016058867 A1 | 4/2016 |
| WO | 2016071157 A1 | 5/2016 |
| WO | 2018090105 A1 | 5/2018 |

OTHER PUBLICATIONS

Shen Chunlin, Production And Construction of Pre-Mixed Mortar, Building Materials Press, 2015 (8), pp. 117-118, Beijing, China.
Wu Shusen, Interfacial chemistry and colloid chemistry, Applied Physical Chemistry, 1993, vol. 1, pp. 177-179, Higher Education Press, Beijing, China.
Shatat, Raid Saleh et al., "Synthesis and Characterization of Different Molecular Weights Polyacrylamide," IOSR Journal of Applied Chemistry, vol. 10, Issue 4, 2017, pp. 67-73.
NPL_https://en.wikipedia.org/wiki/Flocculation_July 9, 2024.

* cited by examiner

POLYMER POWDER COMPOSITIONS WHICH CAN BE REDISPERSED IN WATER

CROSS REFERENCE TO RELATED APPLICATIONS

This application is the U.S. National Phase of PCT Appln. No. PCT/EP2018/074048 filed Sep. 6, 2018, the disclosure of which is incorporated in its entirety by reference herein.

BACKGROUND OF THE INVENTION

1. Field of the Invention

The invention relates to water-redispersible polymer powder compositions (dispersible powder compositions) for soil stabilization (soil consolidation), to processes for producing the dispersible powder compositions, and to the use thereof for soil stabilization and sand binding.

2. Description of the Related Art

Dust control and soil stabilization are a major environmental and health problem. Dust is often perceived only as a nuisance; severe development of dust may also be detrimental to safety, by lowering visibility on sandy roads and building sites, for example. Dust is also a health hazard, owing in particular to the presence therein of respirable fine dust. In the case of sandy roads, not only dust reduction but also a longer durability associated with a lower maintenance cost is an important economic factor. By means of soil stabilization, it is possible to retard not only wind erosion but also water erosion and so to reduce the development of potholes and traffic ruts.

The most common means of reducing dust is to keep the surface moist with water; in hot, dry regions, however, this is only a very short-term remedy. Unmade roads have for a long time also had their surface sprayed with mineral oil products, with all of the associated disadvantages for the environment. EP 0 992 565 A1 describes a method for firming and hydrophobizing soil materials, using alkali metal silicates and alkali metal siliconates. US 2011/0274489 A1 and U.S. Pat. No. 8,033,750 B2 use mixtures of hydrophobizing agents (methyl siliconate) and aqueous polymer dispersions (polyacrylic acid and polyvinyl acetate) for soil stabilization. US 2011/0274490 A1 describes a soil consolidation composition comprising an aqueous polymer dispersion and an aqueous emulsion of pitch and rosin. DE OS 2210256 and DE 43 24 474 A1 each describe the consolidation of soil through the introduction of aqueous polymer dispersions. WO 2018/090105 A1 relates to a composition for soil consolidation that comprises a first polymer with acrylamide units and a second polymer with acrylate monomer units, and solvent, with the two polymers being crosslinked. Soil consolidation by means of water-redispersible polymer powder compositions is described in WO 2006/063729 A1. The consolidation of sand in paving joints by means of water-redispersible polymer powders and cement is described in EP 1 892 228 A.

The use of anionic and nonionic arylamide polymers for soil stabilization is described in Illinois Urban Manual Practice Standard, Polyacrylamid (PAM) for Temporary Soil Stabilization, February 2011 (http://www.aiswcd.org/illinois-urban-manual/practice-standards/). US 2016/0177179 A1 and WO 2016/071157 A1 each use water-soluble or water-swellable flocculating agent, such as ultrahigh molecular mass acrylamide-acrylic acid copolymers, for soil consolidation, applying them as a liquid or as a powder. Soil consolidation is accomplished through the agglomeration (flocculation) of the particles of dust and of sand. This type of soil firming and dust binding is suitable only for short-term stabilization. Further problems are the poor solubility of these flocculating agents in water and their sensitivity to moisture in storage (U.S. Pat. No. 7,874,101 B2).

A longer duration of stabilization could be achieved by applying the flocculating agent together with an organic, polymeric binder, such as polyvinyl acetate. Important factors in the use of a mixture of polymeric binder and flocculating agent, however, are the rapid and uniform distribution of the mixture components. This is made more difficult, however, by the fact that in such mixtures, the predominant fraction is the polymeric binder, and the fraction of flocculating agent is usually very small, for example 0.1 to 2 wt %, based on the overall solids content of the mixture. In the case of the ultrahigh molecular mass flocculating agents (Brookfield viscosity of at least 20 mPas in 1 wt % aqueous solution at 23° C.), their application is also made more difficult by their poor solubility in water and poor miscibility with polymeric binders.

In the case of application in liquid form or in powder form, the different solubilities, or the different particle sizes, densities and powder morphologies in the case of powders, are a reason why the compositions obtained using conventional blending techniques are not homogeneous. In the case of powder mixtures of polymeric binders and flocculating agents, furthermore, a problem is that there are instances of separation (inhomogeneity) on storage in the silo or in the pack.

It was an object, therefore, to develop a presentation form with which the aforesaid disadvantages associated with the use of ultrahigh molecular mass flocculating agents as soil consolidation additives are overcome.

SUMMARY OF THE INVENTION

A subject of the invention is a water-redispersible polymer powder composition comprising a) a base polymer of one or more monomers from the group containing vinyl esters of unbranched or branched alkylcarboxylic acids having 1 to 15 carbon atoms, methacrylic esters and acrylic esters of alcohols having 1 to 15 carbon atoms, vinylaromatics, olefins, dienes and vinyl halides, b) one or more flocculating agents from the group containing b1) acrylamide homopolymers or acrylamide copolymers of one or more monomers from the group containing acrylamide, methacrylamide, acrylic acid, methacrylic acid, acrylonitrile, 2-acrylamido-2-methylpropanesulfonic acid; b2) cationic homopolymers or copolymers of one or more cationic monomers with quaternary ammonium group, from the group containing diallyldimethylammonium chloride (DADMAC), diallyldiethylammonium chloride (DADEAC), (3-methacryloyloxy)-propyltrimethylammonium chloride (MPTAC), (2-methacryloyloxy)-ethyltrimethylammonium chloride (METAC), (3-methacrylamido) pro-pyltrimethylammonium chloride (MAPTAC); b3) polysaccharides from the group containing starch, starch derivatives, cellulose and cellulose derivatives, where the flocculating agents b) have a Brookfield viscosity of at least 20 mPas each in 1 wt % solution in water at 23° C.

DETAILED DESCRIPTION OF THE PREFERRED EMBODIMENTS

The Brookfield viscosity of the 1 wt % solution in water is determined with a Brookfield viscometer, after conditioning to 23° C., using spindle 1 or 2, at 20 revolutions per minute.

The term "water-redispersible polymer powder compositions" refers to powder compositions which are obtainable by drying the corresponding aqueous dispersions of the base polymers in the presence of protective colloids (drying aid). Because of this production procedure, the finely divided resin (base polymer) of the dispersion, and in the case of the present invention the flocculating agent as well, become enveloped by a water-soluble protective colloid in sufficient quantity. During drying, the protective colloid acts like a jacket, preventing the particles from sticking together. On redispersion of water, the protective colloid rapidly dissolves again in water to give an aqueous dispersion of the original polymer particles with flocculating agent and protective colloid dissolved in the dispersion.

Suitable flocculating agents b1) are acrylamide homopolymers and acrylamide copolymers of one or more monomers from the group containing acrylamide, methacrylamide, acrylic acid, methacrylic acid, acrylonitrile, 2-acrylamido-2-methylpropanesulfonic acid (AMPS) as described in WO 2016/071157. The acrylamide homopolymers and acrylamide copolymers can be prepared by polymerization processes known to the skilled person. Acrylamide homopolymers and acrylamide copolymers suitable for the production of the water-redispersible polymer powder compositions are also available commercially. The acrylamide homopolymers and acrylamide copolymers are swellable in water or soluble in water.

Preferred flocculating agents b1) are the copolymers of acrylamide. More preferred are the copolymers of acrylamide with acrylic acid and/or AMPS. Most preferred as flocculating agents b1) are copolymers which contain 60 to 90 wt % of acrylamide units and 10 to 40 wt % of acrylic acid units, with the figures in wt % adding up to 100 wt % in each case. Generally speaking, the acrylamide homopolymers and acrylamide copolymers have a weight-average molecular weight Mw of 1,000,000 g/mol to 30,000,000 g/mol, preferably of 5,000,000 g/mol to 30,000,000 g/mol, determined by size exclusion chromatography (SEC) against polystyrene standards, in THF, at 40° C.

Suitable flocculating agents b2) are homopolymers or copolymers of one or more cationic monomers with quaternary ammonium groups, from the group containing diallyldimethylammonium chloride (DADMAC), diallyldiethylammonium chloride (DADEAC), (3-methacryloyloxy)propyltrimethylammonium chloride (MPTAC), (2-methacryloyloxy)ethyltrimethylammonium chloride (METAC), (3-methacrylamido)propyltrimethylammonium chloride (MAPTAC). Particularly preferred are homopolymers or copolymers of Diallyldimethylammonium chloride (poly-DADMAC).

Generally speaking, the cationic polymers contain 50 to 100 wt %, preferably 60 to 100 wt %, more preferably 90 to 100 wt %, and most preferably about 100 wt %, of cationic monomer units with quaternary ammonium group, based on the total weight of the cationic polymer. Suitable nonionic, copolymerizable monomers are vinyl esters having 1 to 15 carbon atoms in the carboxylic acid radical, such as vinyl acetate, acrylamide, hydroxyethyl (meth)acrylate, hydroxypropyl (meth)acrylate, esters of methacrylic acid and acrylic acid with alcohols having 4 to 13 carbon atoms, such as methyl methacrylate or butyl acrylate, and also N-vinylpyrrolidone, N-vinylcaprolactam, and/or mixtures of the stated nonionic comonomers.

The cationic polymers with quaternary ammonium groups can be prepared by polymerization processes known to the skilled person. Suitable cationic polymers are also available commercially. For example, polydiallyldimethylammonium chloride (poly-DADMAC) is available as Catiofast® (BASF) or Superfloc® (Kemira Water Solutions B.V) or Drewfloc® (Ashland Inc.).

Suitable flocculating agents b3) are polysaccharides from the group containing starch, starch derivatives, cellulose and cellulose derivatives.

Suitable starch derivatives are starch ethers, such as cyanalkyl ether starches, hydroxyalkyl ether starches, e.g., hydroxyethyl, hydroxypropyl and hydroxybutylether starches, and carboxymethylated starches. The starch and starch derivatives are in many cases on the market in the form of commercial products.

Suitable cellulose ethers are those from the group of the alkylcellulose ethers, hydroxyalkylcellulose ethers, carboxyalkylcellulose ethers and their mixed ethers with at least two different substituents from the group of the alkyl, hydroxyalkyl and carboxyalkyl group with alkyl radicals having in each case 1 to 10 carbon atoms. Preferred cellulose ethers are methylcellulose (MC), ethylcellulose (EC), methylhydroxyethylcellulose (MHEC), ethylhydroxyethylcellulose (EHEC), methyl ethyl ketone-hydroxyethylcellulose (MEHEC), hydroxyethylcellulose (HEC), hydroxypropylcellulose (HPC), methylhydroxypropylcellulose (MHPC), hydroxypropyl-methylcellulose (HPMC), hydroxyethylmethylcellulose (HEMC) and carboxymethylcellulose (CMC). Suitable cellulose ethers are available commercially, examples being Berocoll® from AkzoNobel NV, Walocel® from Wolff Cellulosics GmbH and Co. KG, Methocelor Cellosize® from Dow Chemical Company, Tylose® from SE Tylose GmbH and Co. KG, and Culminal® Natrosol® from Ashland Inc.

The stated flocculating agents have a Brookfield viscosity of at least 20 mPas, preferably at least 50 mPas, each in 1 wt % solution in water at 23° C.

The water-redispersible polymer powder compositions contain generally 0.05 to 2.0 wt %, preferably 0.1 to 1.0 wt %, of flocculating agents b), based in each case on the total weight of the polymeric constituents of the water-redispersible polymer powder composition.

Monomers suitable for preparing the aqueous polymer dispersion of the base polymer are vinyl esters of unbranched or branched alkylcarboxylic acids having 1 to 15 carbon atoms, methacrylic esters and acrylic esters of alcohols having 1 to 15 carbon atoms, vinylaromatics, olefins, dienes or vinyl halides.

Preferred vinyl esters are vinyl acetate, vinyl propionate, vinyl butyrate, vinyl-2-ethylhexanoate, vinyl laurate, 1-methyl vinyl acetate, vinyl pivalate and vinyl esters of alpha-branched monocarboxylic acids having 9 to 13 carbon atoms, for example VeoVa9® or VeoVa10® (tradenames of Momentive). Particularly preferred is vinyl acetate.

Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particularly preferred are methyl acrylate, methyl methacrylate, n-butyl acrylate and 2-ethylhexyl acrylate.

Examples of olefins and dienes are ethylene, propylene and 1,3-butadiene. Suitable vinylaromatics are styrene and vinyltoluene. A preferred vinyl halide is vinyl chloride. Optionally there may also be 0.05 to 10 wt %, based on the total weight of the monomers, of auxiliary monomers copolymerized. Examples of auxiliary monomers are ethylenically unsaturated monocarboxylic and dicarboxylic acids, preferably acrylic acid, methacrylic acid, fumaric acid and maleic acid; ethylenically unsaturated carboxamides and carbonitriles, preferably acrylamide and acrylonitrile;

monoesters and diesters of fumaric acid and maleic acid such as the diethyl and diisopropyl esters and also maleic anhydride, ethylenically unsaturated sulfonic acids and their salts, preferably vinyl sulfonic acid, 2-acrylamido-2-methylpropanesulfonic acid. Other suitable auxiliary monomers are comonomers with epoxide functionality such as glycidyl methacrylate and glycidyl acrylate for crosslinkable base polymers. Further examples are silicon-functional comonomers, such as acryloyloxy-propyltri(alkoxy)- and methacryloyloxypropyltri(alkoxy)-silanes such as methacryloyloxypropyltrimethoxysilane, vinyltrialkoxysilanes and vinylmethyldialkoxysilanes such as vinyltrimethoxysilane or vinyltriethoxysilane or vinylmethyldimethoxysilane, in which case alkoxy groups present may be, for example, methoxy, ethoxy and ethoxypropylene glycol ether radicals.

The monomer selection and the selection of the weight fractions of the comonomers are made such as to result in general in a glass transition temperature Tg of −30° C. to +40° C. The glass transition temperature Tg of the base polymers can be ascertained in a known way by means of differential scanning calorimetry (DSC). The Tg may also be calculated approximately in advance using the Fox equation. According to Fox T. G., Bull. Am. Physics Soc. 1, 3, page 123 (1956): $1/Tg=x1/Tg1+x2/Tg2+\ldots+xn/Tgn$, where xn is the mass fraction (wt %/100) of the monomer n, and Tgn is the glass transition temperature, in kelvin, of the homopolymers of the monomer n. Tg values for homopolymers are listed in Polymer Handbook 2nd Edition, J. Wiley & Sons, New York (1975).

Examples of homopolymers and copolymers with suitability as base polymer are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, styrene-1,3-butadiene copolymers.

Preference is given to vinyl acetate homopolymers and copolymers of vinyl acetate with 1 to 40 wt % of ethylene, which optionally also comprise further comonomers from the group of vinyl chloride and vinyl esters having 3 to 12 carbon atoms in the carboxylic acid radical, it being possible in each case as well to copolymerize the stated auxiliary monomers in the stated amounts, where the figures in wt % add up to 100 wt % in each case.

The greatest preference is given to the polymer powder compositions with vinyl acetate homopolymer or with copolymers of vinyl acetate and 1 to 40 wt % of ethylene.

The base polymers are preferably prepared by the emulsion polymerization process, where the polymerization temperature is generally but not necessarily less than 100° C., and where, in the case of the copolymerization of gaseous comonomers such as ethylene, it is also possible to operate under superatmospheric pressure, generally between 5 bar and 100 bar. The polymerization is initiated with the initiators or redox initiator combinations that are customary for emulsion polymerization.

The polymerization mixture is stabilized using protective colloids, optionally in combination with emulsifiers. Suitable protective colloids are partly hydrolyzed polyvinyl alcohols; polyvinyl pyrrolidones; polysaccharides in water-soluble form such as starches (amylose and amylopectin), celluloses and their carboxymethyl, methyl, hydroxyethyl and hydroxypropyl derivatives; proteins such as casein or caseinate, soy protein, gelatin; ligninsulfonates; synthetic polymers such as poly-(meth)acrylic acid, polyvinylsulfonic acids; melamine-formaldehydesulfonates, naphthalene-formaldehydesulfonates, styrene-maleic acid copolymers and vinyl ether-maleic acid copolymers.

Preferred protective colloids are partially hydrolyzed polyvinyl alcohols having a degree of hydrolysis of 80 to 95 mol % and preferably a Höppler viscosity in 4% aqueous solution of 1 to 30 mPas (Höppler method at 20° C., DIN 53015). Preference is also given to partially hydrolyzed, hydrophobically modified polyvinyl alcohols having a degree of hydrolysis of 80 to 95 mol % and preferably a Höppler viscosity in 4% aqueous solution of 1 to 30 mPas. Examples thereof are partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 10 carbon atoms, which optionally also contain functional comonomers such as (meth)acrylamide, (meth)acrylic acid, vinyl sulfonate and salts thereof. The fraction of the hydrophobic units is preferably 0.1 to 10 wt %, the fraction of functional comonomer preferably 0.1 to 5 wt %, based in each case on the total weight of the partially hydrolyzed polyvinyl alcohol. Mixtures of the stated polyvinyl alcohols can also be used.

The stated protective colloids have a Brookfield viscosity of not more than 10 mPas each in 1 wt % solution in water at 23° C.

The Brookfield viscosity of the 1 wt % solution in water is determined with a Brookfield viscometer, after conditioning to 23° C., using spindle 1 or 2, at 20 revolutions per minute.

The water-redispersible polymer powder compositions are produced by spray-drying the dispersions, optionally after addition of further protective colloid as a drying aid. This spray drying takes place in customary spray-drying units, where the atomization may take place by means of one-fluid, two-fluid or multifluid nozzles or with a rotating disk. The exit temperature selected is generally in the range from 45° C. to 120° C., preferably 60° C. to 90° C., depending on unit, resin Tg and desired degree of drying. The viscosity of the feed for atomizing is adjusted by way of the solids content so as to give a value of <500 mPas (Brookfield viscosity at 20 revolutions and 23° C.), preferably <250 mPas. The solids content of the dispersion for atomizing is >35%, preferably >40%.

The drying aid is used in general in a total amount of 0.5 to 30 wt %, based on the polymeric constituents of the dispersion. This means that the total amount of protective colloid before the drying procedure can be 1 to 30 wt %, based on the polymer fraction. Preference is given to using 5 to 20 wt % of protective colloid, based on the polymer fraction. The amount of protective colloid in this case is preferably 1 to 20 wt %, more preferably 3 to 10 wt %, based in each case on the polymer fraction in the redispersible polymer powder.

Suitable drying aids are the aforementioned protective colloids. Preference is given to partially hydrolyzed polyvinyl alcohols and partially hydrolyzed, hydrophobically modified polyvinyl alcohols each having a degree of hydrolysis of 80 to 95 mol % and each having a Höppler viscosity in 4% aqueous solution of preferably 1 to 30 mPas (Happier method at 20° C., DIN 53015).

The flocculating agent b) is added during the spray drying of the aqueous dispersion of the base polymer. For this purpose, the flocculating agent b), in solution in water or in an aqueous salt solution, or as an emulsion in water or in a water/solvent mixture, is spray-dried together with the aqueous dispersion of the base polymer and the drying aid. Suitable salt solutions are aqueous solutions with 0.1 to 10 wt %, preferably 2 to 6 wt %, of alkali metal salt, based on the total weight of the aqueous solution. The sulfates and acetates of lithium, sodium and potassium are preferred. The emulsions of the flocculating agents are available commercially.

In another preferred embodiment, the drying aid is dissolved in the aqueous salt solution and subsequently the flocculating agent b) is dissolved in the aqueous salt solution. This solution is then spray-dried with the aqueous dispersion of the base polymer.

In the atomization an amount of up to 1.5 wt % of antifoam, based on the base polymer, has proven favorable in many instances. One example of an antifoam is Agitan$^R$ 299 from Münzing.

The water-redispersible polymer powder compositions can also be modified with a hydrophobizing agent. For that purpose, hydrophobizing agent is also added during spray drying. Suitable hydrophobizing agents are organosilicon compounds and also fatty acids and fatty acid esters as described in EP 741760 B1 and EP 765898 A2. Suitable organosilicon compounds are silicic esters, tetraorganosilanes, organoorganoxysilanes and polysilanes. Preference is given to the organoorganoxysilanes $SiR_n(OR')_{4-n}$ with n=1 to 3, more particularly isooctyltriethoxysilane, n-octyltriethoxysilane and hexadecyltriethoxysilane. Suitable fatty acids are branched and unbranched, saturated and unsaturated fatty acids having in each case 8 to 22 carbon atoms. Suitable fatty acid esters are the $C_1$ to $C_8$ alkyl esters of the $C_8$ to $C_{22}$ fatty acids. Also suitable are the monoglycol and diglycol esters of the Cs to C22 fatty acids. Also suitable are the mono-, di- and tri-fatty acid esters of glycerol with the $C_8$ to $C_{22}$ fatty acids. Preference is given to the monoglycol and diglycol esters of lauric acid and of oleic acid, and also to the mono-, di- and tri-fatty acid esters of glycerol with lauric acid and with oleic acid. Most preferred are the corresponding esters of the unsaturated fatty acids such as of oleic acid. The stated hydrophobizing agents can be used alone or in a mixture. Generally speaking, they are used in an amount of 0.5 to 20 wt %, preferably 1 to 10 wt %, based in each case on the total weight of the polymeric constituents.

In order to extend the storage life by improving the blocking stability, particularly in the case of powders with a low glass transition temperature, the powder obtained can be furnished with an antiblocking agent (anticaking agent), preferably 1 to 30 wt %, based on the total weight of the polymeric constituents. Examples of antiblocking agents are Ca and/or Mg carbonate, talc, gypsum, silica, kaolins such as metakaolin, and silicates having particle sizes preferably in the range from 10 nm to 10 µm.

The water-redispersible polymer powder compositions may be used in powder form or in dispersion in water for soil consolidation, dust binding and the binding of jointing sand, in paving joints, for example. The aqueous dispersion is in these cases obtained by simply stirring the polymer powder composition into water.

The amounts required for dust binding and soil consolidation depend on the field of use. They are known to the skilled person and can be ascertained and optimized by simple tests. Generally speaking, the amounts used are 0.01 to 5 wt %, preferably 0.2 to 2 wt %, of the water-redispersible polymer powder composition, based on the earth material to be consolidated.

The water-redispersible polymer powder composition is suitable for soil consolidation and dust binding across a multiplicity of substrates. For the consolidation, for example, of unmade roads, for the consolidation of slopes and heaps, for the consolidation of unsurfaced parking areas, landing strips or sports grounds. For soil consolidation, the substrate in question may be loosened or removed down to a depth of 1 to 500 mm, preferably 50 to 150 mm, and the loose material mixed with the polymer powder composition or the aqueous dispersion thereof. In general the substrate thus prepared is subsequently leveled and compacted. As an alternative to this, the polymer powder composition or aqueous dispersion thereof may be applied to the untreated substrate by spraying.

The water-redispersible polymer powder composition may also be applied together with hydraulically setting binders, for example cement or plaster. With this combination, an improvement is achieved both in setting and in the drying time.

The water-redispersible polymer powder composition is also suitable as a binder or cobinder for construction applications, such as, for example, in construction adhesive formulations, grout formulations and repair mortar formulations, particularly if loamy sands are employed as a filler in such formulations.

With the present invention, homogeneous powder compositions of polymeric binder and flocculating agent are obtained, in which the two components are distributed uniformly in spite of differences in solubility and dispersability. The reason for this is that the flocculating agent is spray-dried jointly with the aqueous dispersion of the base polymer and the drying aid. In this presentation form, it is easy to apply even flocculating agents of high molecular mass which tend to form gel inhomogeneously with water. Accordingly it is possible to utilize synergies of the two components for soil consolidation.

In the presentation form of a water-redispersible polymer powder, the flocculating agent is distributed rapidly and uniformly in water, overcoming the disadvantage of the poor solubility. With this presentation form, moreover, the moisture sensitivity of the flocculating agents is reduced and their storage stability enhanced.

The examples which follow serve for further elucidation of the invention:

Test methods:

Determining the blocking resistance (BR): For determining the blocking resistance, the powder under test was introduced into an iron tube with a screw closure and was then loaded with a metal die. It was stored with loading in a drying cabinet at 50° C. for 16 hours. After cooling had taken place to room temperature, the powder was removed from the tube and the blocking stability was determined qualitatively by crushing of the powder.

The blocking stability was classed as follows:
1=very good blocking stability
2=good blocking stability
3=satisfactory blocking stability
4=zero blocking stability, powder no longer free-flowing after crushing.

Inventive Example 1

First 53 g of sodium sulfate were dissolved in 1350 g of water and then 420 g of a 20 wt % aqueous solution of a polyvinyl alcohol having a Höppler viscosity of 4 mPas and a degree of hydrolysis of 88 mol% (Mowiol 4-88 from Kuraray) and 360 g of an 11 wt % aqueous solution of a polyvinyl alcohol having a Höppler viscosity of 13 mPas and a degree of hydrolysis of 88 mol % (Mowiol 13-88 from Kuraray) were added and the mixture was stirred for 10 minutes.

Subsequently 3.6 g of an acrylamide-acrylic acid copolymer powder with 70 wt % of acrylamide and 30 wt % of acrylic acid (Flobond A30 from SNF) were added to this solution, and the mixture was stirred for 4 hours.

The result was a clear solution having a viscosity of 61 mPas (Brookfield BF20, Spindle 1 at 23° C.)

This solution was admixed with 3 kg of a polyvinyl alcohol-stabilized vinyl acetate-ethylene copolymer dispersion (93 wt % of vinyl acetate, 7 wt % of ethylene, Tg=16° C.) having a solids content of 58 wt %, and the mixture was stirred for an hour.

The result was a homogeneous dispersion having a viscosity of 95 mPa·s (Brookfield BF20, spindle 1 at 23° C.), which contained around 0.2 wt % of flocculating agent, based on the solids fraction.

The dispersion was then sprayed using a two-fluid nozzle. The atomizing component employed was air compressed to 4 bar beforehand. The droplets formed were dried concurrently with air heated to 125° C. The dry powder obtained was admixed with 3 wt % of kaolin and 15 wt % of calcium carbonate, based on the dry fraction of the dispersion.

Spray drying gave a redispersible polymer powder composition having a blocking resistance of 2.

In spite of the fraction of ultrahigh molecular mass flocculating agent b), it was possible to produce a blocking-resistant powder having very good dispersibility and outstanding settling characteristics.

Comparative Example 2

5.6 g of an acrylamide-acrylic acid copolymer with 70 wt % of acrylamide and 30 wt % of acrylic acid (Flobond A30 from SNF) as a powder were added with stirring to 1350 g of water without sodium sulfate. After a stirring time of 8 hours, an inhomogeneous, gel-like solution was obtained.

Even after the addition of the polyvinyl alcohol solutions and of the polymer dispersion, it was not possible to produce a homogeneous dispersion having a low viscosity. Spray drying of the dispersion was not possible.

Inventive Example 3

29.2 kg of a polyvinyl alcohol-stabilized vinyl acetate ethylene copolymer dispersion (93 wt % of vinyl acetate, 7 wt % of ethylene, Tg=16° C.) having a solids content of 58 wt % were blended with 9.1 kg of water, 3.6 kg of a 20 wt % aqueous solution of a polyvinyl alcohol having a Höppler viscosity of 4 mPas and a degree of hydrolysis of 88 mol % (Mowiol 4-88 from Kuraray) and 2.9 kg of an 11 wt % aqueous solution of a polyvinyl alcohol having a Höppler viscosity of 13 mPas and a degree of hydrolysis of 88 mol % (Mowiol 13-88 from Kuraray).

Subsequently 112 g of a 30 wt % aqueous emulsion of an acrylamide-acrylic acid copolymer with 70 wt % of acrylamide and 30 wt % of acrylic acid (Flobond Emulsion L33 from SNF) were added and the mixture was stirred for 2 hours. The result was a homogeneous mixture having a viscosity of 250 mPas (Brookfield BF20, SP1 at 23° C.)

The mixture was then sprayed using a two-fluid nozzle. The atomizing component employed was air compressed to 4 bar beforehand. The droplets formed were dried concurrently with air heated to 125° C. The dry powder obtained was admixed with 3 wt % of kaolin and 15 wt % of calcium carbonate, based on the dry fraction of the mixture. The blocking stability was 2.

Comparative Example 4

The procedure of the inventive example 3 was repeated, with the difference that no flocculating agent was added to the polyvinyl alcohol-stabilized vinyl acetate-ethylene copolymer dispersion, and this dispersion was dried. The blocking stability was 3.

Inventive Example 5

The procedure of the inventive example 3 was repeated, with the difference that instead of 3.6 kg of a 20 wt % aqueous solution of a polyvinyl alcohol having a Höppler viscosity of 4 mPas and a degree of hydrolysis of 88 mol % (Mowiol 4-88 from Kuraray), the same amount of a 20 wt % aqueous solution of a partially hydrolyzed vinyl acetate-VeoVa10-vinyl sulfonate copolymer was added. The blocking stability of the resultant powder was 2.

Comparative Example 6

1000 g of the dispersible powder obtained in comparative example 4 were mixed with 1.6 g of an acrylamide-acrylic acid copolymer powder with 70 wt % of acrylamide and 30 wt % of acrylic acid (Flobond A30 from SNF) using a powder mixer (GFL overhead shaker 3040, GFL Gesellschaft für Labortechnik).

Testing of soil consolidation:

Production of the test specimens:

In each case 900 g of loam, 100 g of Milke cement CEM 42.6, 260 g of water and 40 g of dispersible powder composition from the inventive or comparative examples were mixed in a mortar mixer (Toni-Technik) for 2 minutes and then cast in a mold to give test specimens. The dimensions of the test specimens in each case were as follows: length 15.3 cm, width 3.8 cm and height 3.8 cm. After 24 hours, the test specimens were removed from the mold and stored under standard conditions (23° C.)

After 28 days, measurements were made of the flexural tensile strength and compressive strength according to DIN EN 12808-3.

Comparative Example 7

The specimens were produced using, rather than 40 g of dispersible powder composition, 80 mg of an acrylamide-acrylic acid copolymer powder with 70 wt % of acrylamide and 30 wt % of acrylic acid (Flobond A30 from SNF). This resulted in fissured test specimens, which fell apart during measurement.

The results are summarized in table 1.

TABLE 1

| Powder | Flexural tensile strength [N/mm$^2$] | Compressive strength [N/mm$^2$] |
| --- | --- | --- |
| Inv. Ex. 1 | 0.5 | 2.5 |
| Inv. Ex. 3 | 0.6 | 2.6 |
| Comp. Ex. 4 | 0.2 | 0.9 |
| Inv. Ex. 5 | 0.7 | 3.5 |
| Comp. Ex. 6 | 0.1 | 0.8 |

Comparing inventive examples 1, 3 and 5 with comparative example 6 shows that the dispersible powders modified with the flocculating agent display better mechanical properties than a powder mixture of a dispersible powder with a powder-form flocculating agent. With the powder/powder mixture from comparative example 6, the powder particles of the flocculating agent were unable to dissolve in short mixing times and the relatively small amount of water in the presence of loam, cement and polymer powder. The binding effect is lower than for the unmodified dispersible powder from comparative example 4.

Surprisingly, even with small fractions of flocculating agent in inventive examples 1, 3 and 5, considerably better values were obtained than with the unmodified dispersible powder from comparative example 4.

The best result was achievable with inventive example 5, since the modified polyvinyl alcohol employed therein produced a reduction in the viscosity during application. The result is a more effective redispersion of dispersible powder and inorganic particles.

The invention claimed is:

1. A water-redispersible polymer powder composition comprising:
   a) a base polymer prepared by polymerizing one or more of vinyl esters of unbranched or branched alkylcarboxylic acids having 1 to 15 carbon atoms, methacrylic esters and/or acrylic esters of alcohols having 1 to 15 carbon atoms, vinylaromatics, olefins, dienes and/or vinyl halides,
   b) one or more flocculating agents selected from the group consisting of homopolymers of acrylamide, which has the formula $CH_2=CH-C(=O)-NH_2$, or copolymers of acrylamide with one or more comonomers selected from the group consisting of methacrylamide, acrylic acid, methacrylic acid, acrylonitrile, and 2-acrylamido-2-methylpropanesulfonic acid, where the one or more flocculating agents b) have a Brookfield viscosity of at least 20 mPas in 1 wt % solution in water at 23° C. after conditioning to 23° C., using spindle 1 or 2, at 20 revolutions per minute,
   wherein the acrylamide homopolymers and acrylamide copolymers have weight-average molecular weights Mw of 1,000,000 g/mol to 30,000,000 g/mol, determined by size exclusion chromatography (SEC) against polystyrene standards, in THE, at 40° C.

2. The water-redispersible polymer powder composition of claim 1, wherein at least one of the one or more flocculating agents is a copolymer of acrylamide with acrylic acid and/or 2-acrylamido-2-methylpropanesulfonic acid.

3. The water-redispersible polymer powder composition of claim 1, which comprises 0.05 to 2.0 wt % of the flocculating agent b), based on the total weight of the polymeric constituents of the water-redispersible polymer powder composition.

4. The water-redispersible polymer powder composition of claim 1, which comprises as the base polymer a polymer selected from the group consisting of vinyl acetate homopolymers, copolymers of vinyl acetate with ethylene, copolymers of vinyl acetate with ethylene and one or more further vinyl esters, copolymers of vinyl acetate with ethylene and acrylic ester(s), copolymers of vinyl acetate with ethylene and vinyl chloride, styrene-acrylic ester copolymers and styrene-1,3-butadiene copolymers.

5. The water-redispersible polymer powder composition of claim 1, which further comprises a hydrophobizing agent selected from the group consisting of organosilicon compounds, fatty acids, and fatty acid esters.

6. The water-redispersible polymer powder composition of claim 1, wherein the acrylamide homopolymers and acrylamide copolymers have weight-average molecular weights Mw of 5,000,000 g/mol to 30,000,000 g/mol, determined by size exclusion chromatography (SEC) against polystyrene standards, in THF, at 40° C.

7. The water-redispersible polymer powder composition of claim 1, wherein the water-redispersible polymer powder compositions contain 0.05 to 1.0 wt. % of the one or more flocculating agents b), based on the total weight of the polymeric constituents of the water-redispersible polymer powder composition.

8. The water redispersible polymer powder composition of claim 1, wherein the flocculant is a copolymer containing 60-90 wt. % of polymerized acrylamide having the formula $CH_2=CH-C(=O)-NH_2$.

9. The water redispersible polymer powder of claim 1, wherein the flocculating agent is a copolymer of acrylamide, having the formula $CH_2-CH-C(=O)-NH_2$, with one or more comonomers, the comonomers being selected from the group consisting of methacrylamide, acrylic acid, and acrylonitrile.

10. A process for producing the water-redispersible polymer powder composition of claim 1, comprising spray drying an aqueous dispersion of the base polymer a) in the presence of the flocculating agent b) and a further drying aid, wherein the flocculating agent b) is spray-dried, in solution in water or in solution in an aqueous salt solution, together with the aqueous dispersion of the base polymer and the drying aid.

11. The process for producing the water-redispersible polymer powder composition of claim 10 by spray drying of the aqueous dispersion of the base polymer a) in the presence of the flocculating agent b) and the drying aid, wherein the drying aid comprises at least one polyvinyl alcohol selected from the group consisting of partially hydrolyzed polyvinyl alcohols and partially hydroylzed, hydrophobically modified polyvinyl alcohols, each having a degree of hydrolysis of 80 to 95 mol % and each having a Höppler viscosity in 4% aqueous solution of 1 to 30 mPas.

12. A process for producing the water-redispersible polymer powder composition of claim 1, comprising spray drying an aqueous dispersion of the base polymer a) in the presence of the flocculating agent b) and a further drying aid, wherein the flocculating agent b) is spray-dried in an aqueous emulsion together with the aqueous dispersion of the base polymer and the drying aid.

13. The process for producing the water-redispersible polymer powder composition of claim 12 by spray drying of the aqueous dispersion of the base polymer a) in the presence of the flocculating agent b) and the drying aid, wherein the drying aid comprises at least one polyvinyl alcohol selected from the group consisting of partially hydrolyzed polyvinyl alcohols and partially hydroylzed, hydrophobically modified polyvinyl alcohols, each having a degree of hydrolysis of 80 to 95 mol % and each having a Höppler viscosity in 4% aqueous solution of 1 to 30 mPas.

14. In a process for binding dust by addition of a redispersible polymer powder composition, the improvement comprising contacting the dust with the water-redispersible polymer powder composition of claim 1, in powder form or as an aqueous dispersion of the redispersible polymer powder composition.

15. The process of claim 14, where the water-redispersible polymer powder composition is further combined with a hydraulically setting binder.

16. In a process for consolidating soil by addition of a redispersible polymer powder composition, the improvement comprising contacting the soil with the water-redispersible polymer powder composition of claim 1, in powder form or as an aqueous dispersion of the redispersible polymer powder composition.

17. The process of claim 16, where the water-redispersible polymer powder composition is further combined with a hydraulically setting binder.

18. In a process for binding jointing sand by addition of a redispersible polymer powder composition, the improvement comprising contacting the jointing sand with the water-redispersible polymer powder composition of claim 1, in powder form or as an aqueous dispersion of the redispersible polymer powder composition.

19. The process of claim 18, where the water-redispersible polymer powder composition is further combined with a hydraulically setting binder.

20. A construction adhesive formulation, grout formulation, or mortar repair formulation, comprising as a binder or a co-binder, the water- redispersible polymer powder composition of claim 1 in powder form or as an aqueous dispersion.

21. The construction adhesive of claim 20, further comprising at least one hydraulically setting binder.

22. A process for producing a water-redispersible polymer powder composition of claim 1, comprising spray drying an aqueous dispersion of the base polymer a) in the presence of the flocculating agent b) and a drying aid, wherein the flocculating agent b), prior to spray drying, is supplied as a solution in water, as a solution in an aqueous salt solution, or as an aqueous emulsion, together with the aqueous dispersion of the base polymer and the drying aid, wherein the drying aid is selected from the group consisting of partly hydrolyzed polyvinyl alcohols, polyvinyl pyrrolidones, polysaccharides in water-soluble form, proteins, lignin sulfonates, poly (meth) acrylic acids, melamine-formaldehydesulfonates, naphthalene-formaldehydesulfonates, styrene-maleic acid copolymers, vinyl ether-maleic acid copolymers, and mixtures thereof.

23. A water-redispersible polymer powder composition comprising:
   a) a base polymer prepared by polymerizing one or more of vinyl esters of unbranched or branched alkylcarboxylic acids having 1 to 15 carbon atoms, methacrylic esters and/or acrylic esters of alcohols having 1 to 15 carbon atoms, vinylaromatics, olefins, dienes and/or vinyl halides,
   b) one or more flocculating agents selected from the group consisting of homopolymers acrylamide, which has the formula $CH_2=CH-C(=O)-NH_2$, or copolymers of acrylamide with one or more comonomers selected from the group consisting of methacrylamide, acrylic acid, methacrylic acid, acrylonitrile, and 2-acrylamido-2-methylpropanesulfonic acid, where the one or more flocculating agents b) have a Brookfield viscosity of at least 20 mPas in 1 wt % solution in water at 23° C. after conditioning to 23° C., using spindle 1 or 2, at 20 revolutions per minute,
   wherein at least one of the one or more flocculating agents is a copolymer which contain 60 to 90 wt % of acrylamide units and 10 to 40 wt % of acrylic acid units.

24. A water-redispersible polymer powder composition comprising:
   a) a base polymer prepared by polymerizing one or more of vinyl esters of unbranched or branched alkylcarboxylic acids having 1 to 15 carbon atoms, methacrylic esters and/or acrylic esters of alcohols having 1 to 15 carbon atoms, vinylaromatics, olefins, dienes and/or vinyl halides,
   b) one or more flocculating agents selected from the group consisting of homopolymers acrylamide, which has the formula $CH_2=CH-C(=O)-NH_2$, or copolymers of acrylamide with one or more comonomers selected from the group consisting of methacrylamide, acrylic acid, methacrylic acid, acrylonitrile, and 2-acrylamido-2-methylpropanesulfonic acid, where the one or more flocculating agents b) have a Brookfield viscosity of at least 20 mPas in 1 wt % solution in water at 23° C. after conditioning to 23° C., using spindle 1 or 2, at 20 revolutions per minute, wherein the one or more flocculating agents b) are homopolymers of acrylamide, which has the formula $CH_2=CH-C(=O)-NH_2$, or copolymers of acrylamide containing 60 to 90 wt. % of acrylamide and 10 to 40 wt. % of acrylic acid, wherein the wt. percents of acrylamide and acrylic acid total 100 wt. %.

\* \* \* \* \*